Patented July 8, 1947

2,423,681

UNITED STATES PATENT OFFICE 2,423,681

USE OF MAGNESIA CATALYSTS IN THE PRODUCTION OF BUTADIENE

Darrel J. Butterbaugh, Philadelphia, and Le Roy U. Spence, Elkins Park, Pa., assignors to Röhm & Haas Company, Philadelphia, Pa., a corporation of Delaware No Drawing. Application August 30, 1944, Serial No. 551,996

3 Claims. (Cl. 260—681)

This invention relates to the production of butadiene. More particularly, it relates to the production of butadiene from ethyl alcohol or from ethyl alcohol in admixture with other substances hereinafter set forth, by passage over certain catalysts at elevated temperatures. The catalysts, per se, as herein disclosed are within the scope of this invention.

Our new catalysts convert ethanol or mixtures of ethanol and acetaldehyde into butadiene in good yields under the conditions set forth below. Crotonaldehyde or acetaldol may be substituted for the acetaldehyde with good results. The ethanol or mixture of ethanol and aldehyde and/or aldol is vaporized and passed over the catalyst in a heated tube at temperatures within the range of from about 375° to about 525° C. and at pressures from above normal to well below normal. The exit gases are cooled to about 0° C. to condenser out water, alcohol, acetaldehyde, crotonaldehyde, and other liquid by-products. Alternatively, these substances may be removed by scrubbing the exit gases with water. The gaseous products contain the butadiene with small amounts of impurities, such as butylenes, ethylene, and hydrogen. The butadiene may be recovered from the gases by absorption in solvents, preferably under pressure, or by other known methods of recovery and purification. The unchanged alcohol, acetaldehyde, and/or crotonaldehyde are preferably recovered from the condensed liquids by distillation and are returned over the catalyst for conversion to butadiene. The ethanol used may contain some water, 90% to 95% of ethanol giving good results. The presence of larger amounts of water in the ethanol has little effect upon the yield of butadiene, but does reduce the rate of reaction. Mixtures of acetaldehyde and ethanol give improved yields of butadiene in mixtures containing up to about fifty mol per cent acetaldehyde, with an optimum yield at about thirty mol per cent acetaldehyde. When such mixtures are used, the rate of reaction is higher than with ethanol alone. The concentration of butadiene in the exit gases is also higher when mixtures of acetaldehyde and ethanol are employed, since less hydrogen is formed. Crotonaldehyde or acetaldol may also be mixed with the ethanol and passed over the catalyst to give good yields of butadiene. A concentration of fifteen to thirty mol per cent crotonaldehyde or acetaldol in the ethanol gives highly satisfactory yields.

Our catalysts comprise the alkali-digested mixtures of magnesium oxide with silica. The silica may be in the precipitated form or as diatomaceous earth. Kaolin may also be used as a source of silica. The catalysts may be made by heating said mixtures with solutions of strongly alkaline bases such as lithium hydroxide, sodium hydroxide, potassium hydroxide, or quaternary ammonium hydroxides such as benzyl trimethyl ammonium hydroxide. Alternatively, the alkali metal silicates, such as sodium silicate, may be used for the digestion. The silicates serve also as a source of silica. The activation may preferably be performed by digesting the admixture with an aqueous solution containing about 0.1% to about 8% of a strongly alkaline material. This operation may be carried out at 50° C. or more, at such concentrations, and is conveniently done by refluxing of the alkaline solution containing the oxides but may be done under pressure. With concentrations of alkali above the preferred range, even lower temperatures may be used. In effecting activation of the catalyst as above described, the factors of time, temperature, and concentration of alkaline material are so controlled that the catalyst produced will efficiently function in the conversion reaction for which it is subsequently to be used.

The diatomaceous earth used is preferably in finely divided form, acid washed to remove iron oxide, and then ignited. A suitable material of this type which may be employed is sold commercially under the trade name of "Superfloss."

Magnesium oxide, prepared by precipitation from soluble salts or by ignition of the nitrates or chlorides, when used alone or mixed with diatomaceous earth or precipitated silica, gives definitely lower yields of butadiene than does the corresponding alkali-digested catalyst. Furthermore, diatomaceous earth or precipitated silica alone is substantially inert as a catalyst at the temperatures at which the catalysts of this invention give optimum yields.

Heating magnesia with strong bases in the presence of precipitated silica or diatomaceous earth gives a catalyst which represses formation of ethylene from ethanol and increases the proportion of butadiene. Heating precipitated magnesium oxide with a sodium silicate solution gives a similar result. Treatments of this type apparently convert such oxide into some form of silicate or into a mixture of oxide and silicate. Such change in the composition of the catalyst may be responsible for the depression of the dehydration to ethylene and the marked increase in the yield of butadiene when our catalysts are employed as herein described.

In the preparation of these catalysts, magnesium oxide or the hydrated oxide is mixed with silica or formed in the presence of silica. While wide variations in the proportions of metal oxide, MgO, to silica, SiO$_2$, may be utilized, the preferred proportions of MgO to SiO$_2$, on a weight basis, fall within the range of 1 to 9 and 4 to 1. The most economical proportions, on a weight basis, with respect to both cost of catalyst and conversion to desired product are 1 to 4 to 1 to 1.

Other substances may be added to our catalysts to serve as promoters. Particularly suited for this purpose are manganese oxide, copper oxide, molybdenum oxide, and cobalt oxide. These serve to increase the rate of reaction. Such substances may be added before or after the alkali digestion, but in most cases it is preferable to add them before heating with the alkali.

The oxide of magnesium is preferably precipitated from aqueous solutions of its soluble salts containing the diatomaceous earth in suspension. Particularly good results are obtained when the soluble salt is a chloride or nitrate, although other soluble salts such as the sulfate may be used. Solutions of such salts up to 2.0 molar are suitable. The oxide may also be precipitated, washed with water, and then mixed with the diatomaceous earth. It is not necessary, however, to wash the precipitated catalyst to remove soluble salts before proceeding with the alkali digestion. Sodium or potassium silicate may be used for precipitating the magnesia, in which case precipitated silica is formed at the same time. The same alkali may be used for the precipitation and the digestion. Excess alkali may be added during the precipitation step. An excess of 25% to 200% of the alkali required for the precipitation has been found to be effective in the digestion step, the optimum amount varying with the ratio of silica to the dehydrating oxide in the catalyst. The digestion may be carried out by heating the admixture in suspension at a temperature of from about 60° to 125° C., using pressure if desired, the optimum temperature depending upon the concentration of the alkaline solution and the time of digestion. The most useful range generally is 90° to about 100° C. for times of one to two hours at concentrations of alkaline solution from about 0.1% up to about 8%. The solution may be somewhat concentrated by evaporation during the digestion, but it is preferred not to evaporate to dryness. After the digestion, the excess alkali and soluble salts are washed out of the precipitate by decantation or filtration. The excess alkali may be partially neutralized to aid in filtration if desired, but the pH of the solution should not be brought below 9 by acidification or the effect of the digestion will be lost. Washing is continued until the wash water is almost neutral (pH 8 to 9) so that essentially all of the alkali is removed from the catalyst.

The precipitate is then dried at temperatures of from about 100° to about 150° C. to remove most of the water, and is then broken up into pieces of suitable size, preferably four to eight mesh, although the mesh size may vary over a relatively wide range.

The catalyst may also be formed in suitable shapes, as, for example, by extrusion of a wet paste before drying. Water left in the catalyst is removed by heating to a temperature of the order of from 350° to 400° C. in a stream of air before use.

These catalysts retain their activity for several days of continuous use. Over extended periods of use, they gradually become covered with a carbonaceous deposit which reduces their activity. The activity of the catalyst can be substantially completely restored, however, by burning off the carbonaceous deposit at temperatures of from 400° to 600° C.

Preparation of catalysts within the scope of our invention is described in the following illustrative examples.

*Example 1*

To a solution of 0.5 mol of magnesium chloride in one liter of water there was added 75 grams of a diatomaceous earth sold on the market under the trade name of "Superfloss" and 2.0 mols of sodium hydroxide in 500 cc. of water (100 per cent excess). The mixture was then digested for two hours at 90° to 95° C., and any water lost by evaporation was replaced. The mixture was then cooled and filtered. The filter cake was washed three times, each time with one liter of water, then dried at 100° C., broken up into 4–8 mesh particles, and ignited at 425° C.

*Example 2*

To a solution of 0.5 mol of magnesium nitrate and 75 grams of Superfloss in one liter of water there was added gradually, while the mixture was stirred, 1.50 mols of sodium hydroxide in 500 cc. of water (50 per cent excess). The mixture was then digested for two hours at 90° to 95° C., and any water lost by evaporation was replaced. The mixture was then cooled and filtered. The filter cake was washed three times, each time with one liter of water, dried at 100° C., broken up into 4–8 mesh particles, and ignited at 425° C.

*Example 3*

A mixture of 0.5 mol of magnesium nitrate and 75 grams of kaolin in one liter of water was prepared. To this was added 2.0 mols of sodium hydroxide (100 per cent excess) in 500 cc. of water. The mixture was digested for two hours at 90° to 95° C. It was then cooled and filtered. The filter cake was washed three times, each time with one liter of water, dried at 100° C., broken up into 4–8 mesh particles, and finally ignited at 425° C.

*Example 4*

A mixture of 1.25 mols of magnesium chloride and 75 grams of Superfloss in 1.5 liters of water was stirred, and to it was added gradually 3.125 mols (25 per cent excess) of sodium hydroxide in 800 cc. of water. The mixture was digested for two hours at 90° to 95° C., the water lost by evaporation being replaced intermittently. After digestion, the mixture was cooled and filtered. The filter cake was washed as above, dried at 100° C., broken up into 4–8 mesh particles, and ignited at 425° C.

*Example 5*

To a mixture of 0.5 mol of magnesium chloride, 0.055 mol of cobaltous nitrate, and 75 grams of Superfloss in one liter of water, there was added 2.22 mols (100 per cent excess) of sodium hydroxide in 500 cc. of water. This mixture was digested for two hours at 90° to 95° C. After being cooled, the suspension was filtered, the filter cake washed as above, dried at 100° C., broken up into 4–8 mesh particles, and finally ignited at 425° C.

*Example 6*

A used sample of the catalyst described in Example 2 (magnesium oxide-Superfloss digested with 50 per cent excess sodium hydroxide) was reactivated with a current of air at 450° to 475° C. After reactivation, 43.4 grams of 4–8 mesh particles, containing approximately 0.23 mol of magnesium oxide, was impregnated with 0.005 mol of copper nitrate in 75 cc. of water. All of the copper nitrate solution was absorbed by the catalyst particles. After being dried at 100° C., the 4–8 mesh particles were ignited at 425° C.

Example 7

A mixture of 0.50 mol of magnesium chloride, 0.055 mol of copper nitrate, 75 grams of Superfloss, and one liter of water was prepared. To this was added gradually 1.39 mols (25 per cent excess) of sodium hydroxide in 400 cc. of water. The suspension was digested for two hours at 90° to 95° C., then cooled, filtered, and the filter cake washed with water. The pH of the final suspension was 8. After being dried at 100° C., the cake was broken up into 4–8 mesh particles and ignited at 425° C.

The catalysts prepared as above noted were used in the production of butadiene as follows: One hundred cc. of the catalyst was placed in a Pyrex tube and heated in an electric tube furnace. The temperature was measured with a thermocouple in the center of the catalyst zone. The charge of alcohol was 125 cc. (2 mols C₂H₅OH). This was added to the pot of a distilling column and was distilled through the column at a constant rate. The vapors were passed over the catalyst. The water, unchanged alcohol, acetaldehyde, and other liquid products of the reaction were condensed out and returned to the still. The gaseous products were passed into Dry Ice-cooled traps (−60° to −70° C.) and were then scrubbed with alcohol at −60° to −70° C. The Dry Ice traps removed some uncondensed acetaldehyde and the major part of the butadiene and butylene, the remainder of the latter two being collected in an alcohol scrubber. The undissolved gases were mainly hydrogen and ethylene with small amounts of carbon dioxide and saturated hydrocarbons. The undissolved gases were measured and analyzed.

The unreacted alcohol and the acetaldehyde returned to the still were fractionated from the water and high-boiling by-products and were returned over the catalyst. Recycling was continued until most of the alcohol had been used up.

The alcohol remaining at the end of the run was determined and deducted from the original charge to calculate the alcohol used up. The butadiene and butene were distilled from the traps and alcohol scrubber through a weighed maleic anhydride scrubber. Unabsorbed gases were condensed and distilled through the maleic anhydride several times until no further increase in weight of the maleic scrubber was obtained. The weight absorbed by maleic anhydride is the butadiene produced, and the weight of unabsorbed condensable gas left is butylene. The acetaldehyde in the still and in the Dry Ice traps was also determined. Yields were calculated for butadiene and are given in the table below as per cent of theory based on the alcohol decomposed.

In some of the runs, the alcohol was fed independently from a constant rate feeder and vaporized into the top of the catalyst tube. In some of these runs, there was no recycling, and in others the unchanged alcohol and acetaldehyde were recycled. In other runs, mixtures of acetaldehyde and ethanol or crotonaldehyde and ethanol and ethanol and water were fed into the catalyst tube.

Results are noted in the following table:

Examples of preparation of butadiene

| | Catalyst Composition, Per Cent by Weight | | | | | | | | Preparation of Butadiene | | |
|---|---|---|---|---|---|---|---|---|---|---|---|
| Run | Catalyst from Example | Magnesium Oxide | Diatomaceous Earth | Kaolin | Cobalt Oxide | Copper Oxide | Per cent Excess NaOH | Hours Digested 90°–95° C. | Temperature | Hours Run | Per cent Yield |
| 1 | 1 | 21.0 | 79.0 | | | | 100 | 2 | 435 | 3.17 | 48.1 |
| 2 | 2 | 21.0 | 79.0 | | | | 50 | 2 | 465 | 2.20 | 42.2 |
| 3 | 3 | 21.0 | | 79.0 | | | 100 | 2 | 430 | 1.37 | 38.8 |
| 4 | 4 | 40.0 | 60.0 | | | | 25 | 2 | 465 | 1.25 | 39.1 |
| 5 | 5 | 20.2 | 75.7 | | 4.1 | | 100 | 2 | 465 | 0.98 | 39.3 |
| 6 | 6 | 20.8 | 78.3 | | | 0.9 | 50 | 2 | 475 | 1.22 | 43.8 |
| 7 | 7 | 20.3 | 76.2 | | | 3.5 | 25 | 2 | 475 | 1.13 | 45.2 |

From the above table, it will be noted that relatively high yields of butadiene may be produced by the catalytic conversion of ethyl alcohol when catalysts prepared as above described are employed.

We claim:

1. A process for producing butadiene which comprises vaporizing ethanol and a member of the group consisting of acetaldehyde, crotonaldehyde, and acetaldol, passing the resulting vapors over a catalytic agent comprising an alkali-digested mixture of silica and magnesium oxide while maintaining said catalytic agent at a temperature of from about 375° to about 525° C., and thereafter removing butadiene from the gaseous mixture.

2. A process for producing butadiene which comprises vaporizing ethanol, passing the resulting vapors over a catalytic agent comprising magnesium oxide admixed and digested with silica in a solution of a strong alkali while maintaining said catalytic agent at a temperature of from about 375° to about 525° C., and thereafter removing butadiene from the gaseous mixture.

3. A process for producing butadiene which comprises vaporizing ethanol, passing the resulting vapors over a catalytic agent comprising magnesium oxide admixed and digested with silica in the presence of a strongly alkaline material and containing a promoter, while maintaining said catalytic agent at a temperature of from about 375° to about 525° C., and thereafter removing butadiene from the gaseous mixture.

DARREL J. BUTTERBAUGH.
LE ROY U. SPENCE.

REFERENCES CITED

The following references are of record in the file of this patent:

UNITED STATES PATENTS

| Number | Name | Date |
|---|---|---|
| 2,323,728 | Ruthruff | July 6, 1943 |
| 2,357,855 | Szukiewixz | Sept. 12, 1944 |
| 1,738,971 | Storch | Dec. 10, 1929 |
| 2,374,433 | Ipatieff | Apr. 24, 1945 |

FOREIGN PATENTS

| Number | Country | Date |
|---|---|---|
| 504,614 | Great Britain | Apr. 24, 1939 |
| 132,401 | Japan | Oct. 3, 1939 |